Patent 3,080,401 — Mar. 5, 1963

2-CYANO-3-DESOXY ANDROSTANE DERIVATIVES AND PROCESS THEREFOR

Albert Bowers, John Edwards, and James C. Orr, Mexico City, Mexico, assignors, by mesne assignments, to Syntex Corporation, a corporation of Panama
No Drawing. Filed Mar. 1, 1962, Ser. No. 176,826
Claims priority, application Mexico, Aug. 31, 1961
21 Claims. (Cl. 260—397.5)

The present invention relates to novel cyclopentanophenanthrene derivatives and to a process for the production thereof.

More particularly the present invention relates to 2-cyano-3-desoxy androstane derivatives.

The novel compounds object of the present invention are represented by the following formulas:

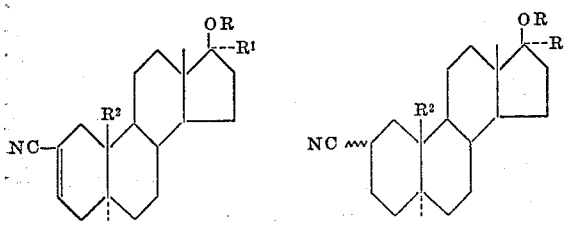

In the above formulas R represents hydrogen or a hydrocarbon carboxylic acyl group of less than 12 carbon atoms; $R^1$ represents hydrogen, lower alkyl, lower alkenyl or lower alkynyl; $R^2$ represents hydrogen or methyl and $R^3$ represents hydrogen or methyl. The wavy line indicates the cyano group may be in the α or β steric configuration.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up ot 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by the above formulas, are anabolic-androgenic agents with a favorable anabolic-androgenic ratio. In addition, they are appetite stimulants with anti-estrogenic, anti-gonadotrophic, blood cholesterol lowering and anti-fibrillatory properties.

These compounds also relieve premenstrual tension, depress the central nervous system and suppress the output of the pituitary gland.

The novel compounds of the present invention are prepared by the process illustrated by the following equation:

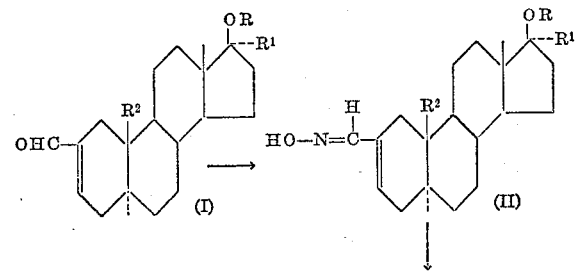

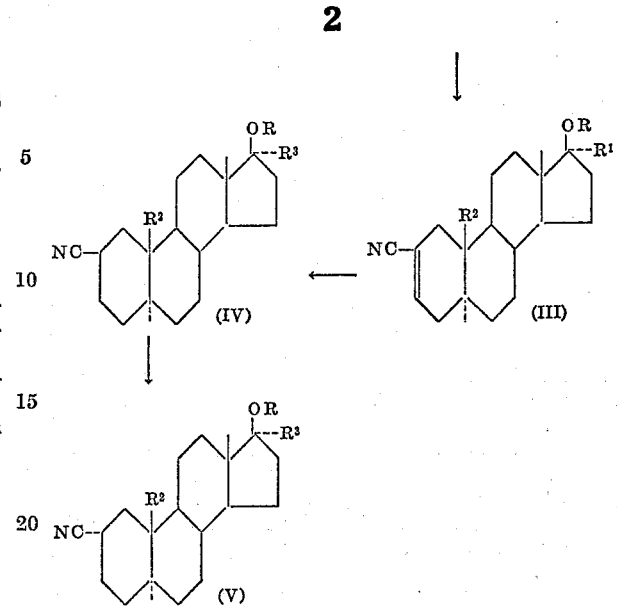

In the above formulas R, $R^1$, $R^2$ and $R^3$ have the same meaning as previously set forth.

In practicing the process outlined above, the starting compound, which is a 2-formyl-Δ²-androsten-17β-ol derivative or the 19-nor derivative thereof (I), (Bowers et al. copending application Serial No. 128,974 filed August 3, 1961), is treated with hydroxylamine hydrochloride in the presence of pyridine, thus affording the corresponding aldoxime (II). The latter compound is treated with acetic anhydride and sodium acetate, at reflux temperature, for a period of time of the order of 2 hours thus giving the respective 2-cyano-Δ²-androsten-17β-ol derivative (III). When the 17β-hydroxyl is secondary ($R^1$=H), there is obtained the corresponding 17-acetate which upon conventional saponification with an alkali metal hydroxide yields the respective 17β-free alcohol. Catalytic hydrogenation of the later compound affords the corresponding saturated 2β-cyano androstan-17β-ol derivative (IV), which upon treatment in a basic medium gives the corresponding 2α-cyano compound (V).

The compounds represented by Formulas III and IV wherein R, $R^1$ and $R^3$ are hydrogen, are conventionally acylated in pyridine with an acylating agent, such as an anhydride derived from a hydrocarbon carboxylic acid of the type described hereinbefore, thus giving the corresponding 17-acylates.

The compounds represented by formulas III and IV wherein R is hydrogen and $R^1$ and $R^3$ are a lower hydrocarbon residue, are conventionally acylated with excess acylating agent in the presence of p-toluenesulfonic acid to give the corresponding 17-acylates.

The following specific examples serve to illustrate but are not intended to limit the scope of the present invention:

Example I

A mixture of 5 g. of 2-formyl-Δ²-androsten-17β-ol, 6 cc. of pyridine, 40 cc. of 95% ethanol and 1.5 g. of hydroxylamine hydrochloride was refluxed for 30 minutes and cooled in ice. The formed precipitate was collected, washed with hot water and dried, thus giving the oxime of 2-formyl-Δ²-androsten-17β-ol.

Following the same procedure there were treated the starting compounds under I, to give the corresponding oximes under II.

| I | II |
|---|---|
| 2-formyl-17α-methyl-Δ²-androsten-17β-ol. | The oxime of 2-formyl-17α-methyl-Δ²-androsten-17β-ol. |
| 2-formyl-17α-ethyl-Δ²-androsten-17β-ol. | The oxime of 2-formyl-17α-ethyl-Δ²-androsten-17β-ol. |
| 2-formyl-17α-vinyl-Δ²-androsten-17β-ol. | The oxime of 2-formyl-17α-vinyl-Δ²-androsten-17β-ol. |
| 2-formyl-17α-ethinyl-Δ²-androsten-17β-ol. | The oxime of 2-formyl-17α-ethinyl-Δ²-androsten-17β-ol. |
| 2-formyl-19-nor-Δ²-androsten-17β-ol. | The oxime of 2-formyl-19-nor-Δ²-androsten-17β-ol. |
| 2-formyl-17α-methyl-19-nor-Δ²-androsten-17β-ol. | The oxime of 2-formyl-17α-methyl-19-nor-Δ²-androsten-17β-ol. |
| 2-formyl-17α-ethinyl-19-nor-Δ²-androsten-17β-ol. | The oxime of 2-formyl-17α-ethinyl-19-nor-Δ²-androsten-17β-ol. |

*Example II*

A mixture of 4 g. of the oxime of 2-formyl-Δ²-androsten-17β-ol, 300 cc. of acetic anhydride and 8 g. of sodium acetate was refluxed for two hours. Ice was added and the cooled mixture evaporated to dryness under reduced pressure. Thereafter there were added 200 cc. of ethanol and the solution was reevaporated to dryness. The total product was chromatographed on alumina to give 2-cyano-Δ²-androsten-17β-ol-acetate [M.P. 181–182° C.; $[\alpha]_D$ +60°(CHCl$_3$)].

The starting compounds under I were treated by the above method, affording the corresponding products under II.

| I | II |
|---|---|
| The oxime of 2-formyl-17α-methyl-Δ²-androsten-17β-ol. | 2-cyano-17α-methyl-Δ²-androsten-17β-ol. |
| The oxime of 2-formyl-17α-ethyl-Δ²-androsten-17β-ol. | 2-cyano-17α-ethyl-Δ²-androsten-17β-ol. |
| The oxime of 2-formyl-17α-vinyl-Δ²-androsten-17β-ol. | 2-cyano-17α-vinyl-Δ²-androsten-17β-ol. |
| The oxime of 2-formyl-17α-ethinyl-Δ²-androsten-17β-ol. | 2-cyano-17α-ethinyl-Δ²-androsten-17β-ol. |
| The oxime of 2-formyl-19-nor-Δ²-androsten-17β-ol. | 2-cyano-19-nor-Δ²-androsten-17β-ol acetate. |
| The oxime of 2-formyl-17α-methyl-19-nor-Δ²-androsten-17β-ol. | 2-cyano-17α-methyl-19-nor-Δ²-androsten-17β-ol. |
| The oxime of 2-formyl-17α-ethinyl-19-nor-Δ²-androsten-17β-ol. | 2-cyano-17α-ethinyl-19-nor-Δ²-androsten-17β-ol. |

*Example III*

2 g. of 2-cyano-Δ²-androsten-17β-ol acetate was dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing 2-cyano-Δ²-androsten-17β-ol.

By the same procedure there was treated 2-cyano-19-nor-Δ²-androsten-17β-ol acetate to give 2-cyano-19-nor-Δ²-androsten-17β-ol.

*Example IV*

A suspension of 0.5 g. of 5% palladium on carbon catalyst in 50 cc. of methanol was hydrogenated for 30 minutes. A solution of 2 g. of 2-cyano-Δ²-androsten-17β-ol in 200 cc. of methanol was added to the catalyst and stirred under a hydrogen atmosphere until the uptake of hydrogen ceased. After removal of the catalyst by filtration the solution was evaporated and the crude residue was purified by crystallization from methylenechloride-hexane, thus giving 2β-cyano-androstan-17β-ol.

Following the above procedure there were treated 2-cyano-17α-methyl-Δ²-androsten-17β-ol, 2-cyano-17α-ethyl-Δ²-androsten-17β-ol, 2-cyano-19-nor-Δ²-androsten-17β-ol and 2-cyano-17α-methyl-19-nor-Δ²-androsten-17β-ol affording correspondingly 2β-cyano-17α-methyl-androstan-17β-ol, 2β-cyano-17α-ethyl-androstan-17β-ol, 2β-cyano-19-nor-androstan-17β-ol and 2β-cyano-17α-methyl-19-nor-androstan-17β-ol.

*Example V*

1 g. of 2β-cyano-androstan-17β-ol was dissolved in 20 cc. of methanol containing 0.2 g. of potassium hydroxide and the mixture was kept at room temperature overnight, poured into water and extracted with methylene chloride. Evaporation of the methylene chloride solution and crystallization of the residue from acetone-hexane yielded 2α-cyano-androstan-17β-ol.

When applying the foregoing technique to 2β-cyano-17α-methyl-androstan-17β-ol, 2β-cyano-17α-ethyl-androstan-17β-ol, 2β-cyano-19-nor-androstan-17β-ol and 2β-cyano-17α-methyl-19-nor-androstan-17β-ol there were respectively obtained 2α-cyano-17α-methyl-androstan-17β-ol, 2α-cyano-17α-ethyl-androstan-17β-ol, 2α-cyano-19-nor-androstan-17β-ol and 2α-cyano-17α-methyl-19-nor-androstan-17β-ol.

*Example VI*

A mixture of 1 g. of 2-cyano-Δ²-androsten-17β-ol, 4 cc. of pyridine and 2 cc. of propionic anhydride was kept at room temperature overnight, poured into ice water, the formed precipitate was filtered, washed with water and dried. Crystallization from acetone-hexane gave 2-cyano-Δ²-androsten-17β-ol-propionate.

By the same technique there were treated 2β-cyano-androstan-17β-ol, 2β-cyano-19-nor-androstan-17β-ol, 2-cyano-19-nor-Δ²-androsten-17β-ol, 2α-cyano-androstan-17β-ol and 2α-cyano-19-nor-androstan-17β-ol, yielding respectively 2β-cyano-androstan-17β-ol-propionate, 2β-cyano-19-nor-androstan-17β-ol-propionate, 2-cyano-19-nor-Δ²-androsten-17β-ol-propionate, 2α-cyano-androstan-17β-ol-propionate and 2α-cyano-19-nor-androstan-17β-ol-propionate.

*Example VII*

Following the procedure of the foregoing example, except that propionic anhydride was substituted by caproic anhydride, cyclopentylpropionic anhydride and benzoic anhydride, there were correspondingly obtained the caproates, cyclopentylpropionates and benzoates of the starting compounds mentioned in the said example.

*Example VIII*

To a solution of 5 g. of 2-cyano-17α-methyl-Δ²-androsten-17β-ol in 100 cc. of anhydrous benzene there were added 1 g. of p-toluenesulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 2-cyano-17α-methyl-Δ²-androsten-17β-ol-acetate.

The starting compounds under I were acetylated by the above technique, yielding the corresponding products under II.

| I | II |
|---|---|
| 2-cyano-17α-ethyl-Δ²-androsten-17β-ol. | 17-acetate of 2-cyano-17α-ethyl-Δ²-androsten-17β-ol. |
| 2-cyano-17α-vinyl-Δ²-androsten-17β-ol. | 17-acetate of 2-cyano-17α-vinyl-Δ²-androsten-17β-ol. |
| 2-cyano-17α-ethinyl-Δ²-androsten-17β-ol. | 17-acetate of 2-cyano-17α-ethinyl-Δ²-androsten-17β-ol. |
| 2-cyano-17α-methyl-19-nor-Δ²-androsten-17β-ol. | 17-acetate of 2-cyano-17α-methyl-19-nor-Δ²-androsten-17β-ol. |
| 2-cyano-17α-ethinyl-19-nor-Δ²-androsten-17β-ol. | 17-acetate of 2-cyano-17α-ethinyl-19-nor-Δ²-androsten-17β-ol. |
| 2β-cyano-17α-methyl-19-nor-androstan-17β-ol. | 17-acetate of 2β-cyano-17α-methyl-19-nor-androstan-17β-ol. |
| 2β-cyano-17α-methyl-androstan-17β-ol. | 17-acetate of 2β-cyano-17α-methyl-androstan-17β-ol. |
| 2β-cyano-17α-ethyl-androstan-17β-ol. | 17-acetate of 2β-cyano-17α-ethyl-androstan-17β-ol. |
| 2α-cyano-17α-methyl-19-nor-androstan-17β-ol. | 17-acetate of 2α-cyano-17α-methyl-19-nor-androstan-17β-ol. |
| 2α-cyano-17α-methyl-androstan-17β-ol. | 17-acetate of 2α-cyano-17α-methyl-androstan-17β-ol. |
| 2α-cyano-17α-ethyl-androstan-17β-ol. | 17-acetate of 2α-cyano-17α-ethyl-androstan-17β-ol. |

Example IX

The starting compounds mentioned in the preceding example were treated following the procedure described in the same example, except that acetic anhydride was substituted by propionic anhydride, caproic anhydride and cyclopentylpropionic anhydride thus affording the corresponding 17-propionates, 17-caproates and 17-cyclopentylpropionates.

We claim:

1. A compound of the following formula:

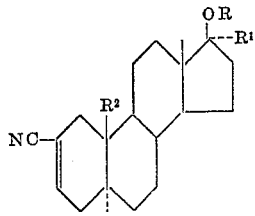

wherein R is selected from the group consisting of hydrogen and a hydrocarbon carboxylic acyl group of less than 12 carbon atoms; $R^1$ is a member of the group consisting of hydrogen, lower alkyl, lower alkenyl and lower alkynyl and $R^2$ is selected from the group consisting of hydrogen and methyl.

2. 2-cyano-17α-methyl-Δ$^2$-androsten-17β-ol.
3. 2-cyano-17α-ethyl-Δ$^2$-androsten-17β-ol.
4. 2-cyano-17α-vinyl-Δ$^2$-androsten-17β-ol.
5. 2-cyano-17α-ethynyl-Δ$^2$-androsten-17β-ol.
6. 2-cyano-19-nor-Δ$^2$-androsten-17β-ol.
7. 2-cyano-17α-methyl-19-nor-Δ$^2$-androsten-17β-ol.
8. 2-cyano-17α-ethynyl-19-nor-Δ$^2$-androsten-17β-ol.
9. 2-cyano-Δ$^2$-androsten-17β-ol.
10. A compopund of the following formula:

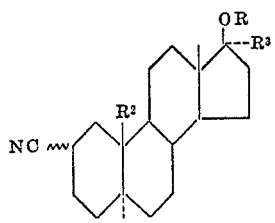

wherein R is selected from the group consisting of hydrogen and a hydrocarbon carboxylic acyl group of less than 12 carbon atoms; $R^3$ is a member of the group consisting of hydrogen and lower alkyl and $R^2$ is selected from the group consisting of hydrogen and methyl.

11. 2β-cyano-androstan-17β-ol.
12. 2β-cyano-17α-methyl-androstan-17β-ol.
13. 2β-cyano-17α-ethyl-androstan-17β-ol.
14. 2β-cyano-19-nor-androstan-17β-ol.
15. 2β-cyano-17α-methyl-19-nor-androstan-17β-ol.
16. 2α-cyano-androstan-17β-ol.
17. 2α-cyano-17α-methyl-androstan-17β-ol.
18. 2α-cyano-17α-ethyl-androstan-17β-ol.
19. 2α-cyano-19-nor-androstan-17β-ol.
20. 2α-cyano-17α-methyl-19-nor-androstan-17β-ol.

21. In the process for the production of 2-cyano-Δ$^2$-androstene derivatives, the step which comprises treating the aldoxime of the corresponding 2-formyl-Δ$^2$-androstene, with sodium acetate in acetic anhydride to give the 2-cyano-Δ$^2$-androstene derivative.

No references cited.